3,799,856
WATERLESS DESALTING PROCESS
Albert D. Franse, Houston, Tex., assignor to Petrolite
Corporation, St. Louis, Mo.
Filed June 15, 1972, Ser. No. 263,019
Int. Cl. B03c 5/02, 5/00
U.S. Cl. 204—188                                        14 Claims

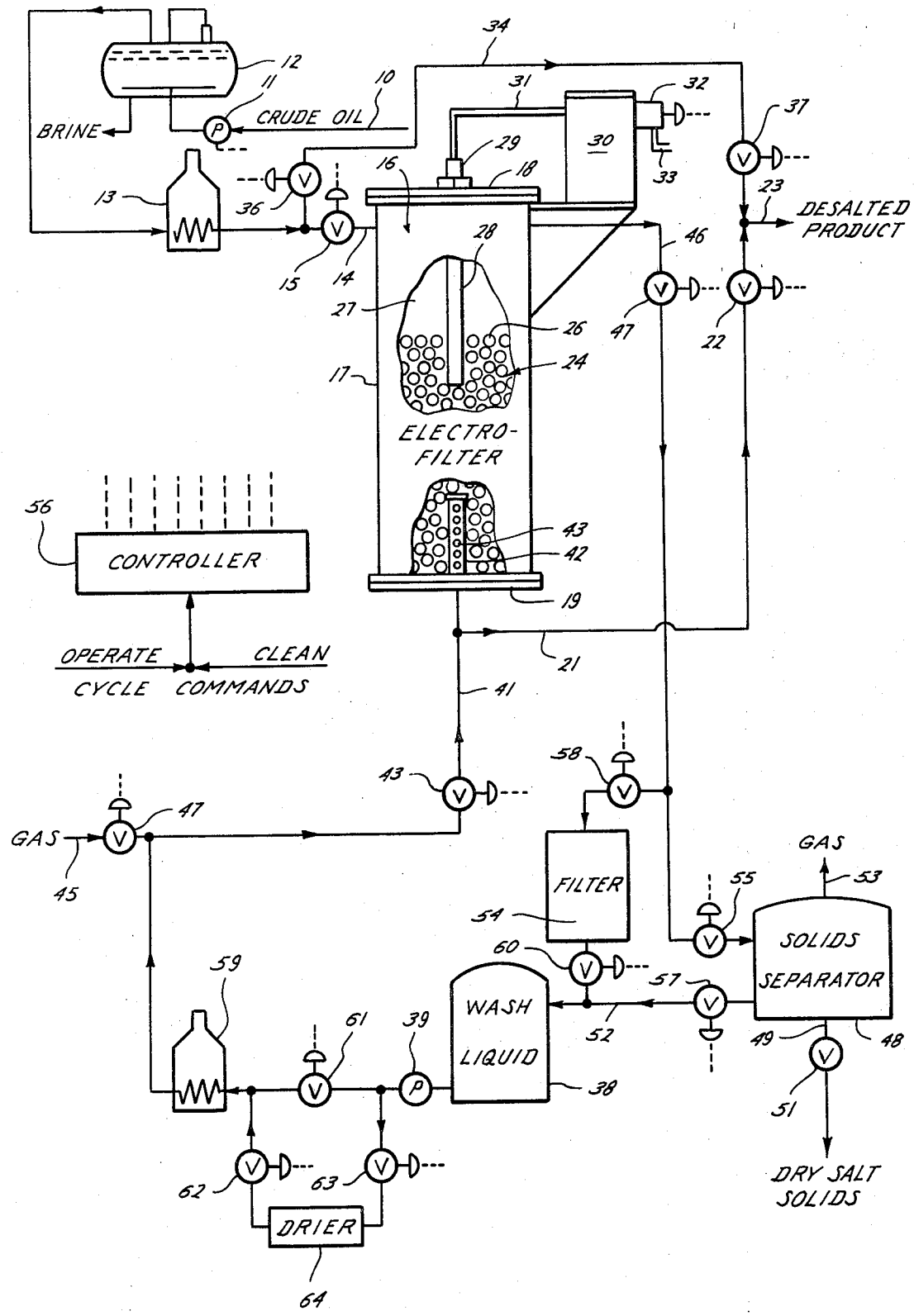

ABSTRACT OF THE DISCLOSURE

A process for the waterless desalting of a stream of salt-contaminated hydrocarbon such as crude oil and its products. The salt-carrying stream is provided (e.g., electric dehydration) with a dispersed water content of less than 1% by volume. The temperature of the stream is adjusted until all of the water is in solution within the hydrocarbon phase and only salt solids are dispersed within the stream. The stream is passed, with all of the water being held in solution, through a porous bed formed of hard granular spheroidal particles. The particles are substantially uniform in size and of a rigid and substantially incompressible dielectric material. An electric field is established within the bed having an intensity of at least 5 kilovolts per inch of DC potential. The salt solids are removed from the stream by their tenacious adhesion to the spheroidal particles. The stream with reduced salt solids is removed to a subsequent utilization. The spheroidal particles are periodically cleaned in the absence of the electric field of the accumulated salt solids with a non-aqueous wash liquid for restoring the efficiency of the bed to remove further quantities of salt solids from the stream under the influence of the electric field. In another aspect of the present process, salt solids are obtained from the particle cleaning in a substantial anhydrous form for ready disposal.

BACKGROUND OF THE INVENTION

(1) Field of the invention

This invention relates to a waterless desalting process; and more particularly, it relates to the removal of salts from hydrocarbons under the action of high-voltage electric fields in an electrofilter.

(2) Description of the prior art

The destructive effects of processing salt-contaminated hydrocarbon streams in refining operations has been well known for many years. These streams are heated for distillation or cracking effects and result in a decomposition of the salt into hydrochloric acid. Hydrochloric acid causes severe damage and lost onstream time in a refinery due to its very highly corrosive attack on metal processing equipment. Consequently, the removal of salt from crude oil (and its products) has been a major refining problem. A process was found in the 1930's for the removal of the salt which contaminated hydrocarbon streams, such as crude oil. This process is designated as the Petreco® Electric Desalting Process, which process is described in U.S. Pat. No. 2,182,145. In this desalting process, the hydrocarbon stream is mixed with a small amount of fresh water (e.g., 10% by volume) forming a water-in-oil emulsion. The resulting emulsion is subjected to an electric field wherein the water is coalesced from a relatively water-free, continuous hydrocarbon phase. The desalted hydrocarbon stream is produced at relatively low cost and has a very small residual salt content. For example, the salt content of a crude oil can be reduced from 50 pounds to approximately 2 pounds per thousand barrels in the mentioned desalting process. As a result, this desalting process is used in practically every refinery throughout the world which must process salt-contaminated crude oils.

The water coalesced by the electric field from the crude oil in the desalting process is a relatively strong brine. In the past, large volumes of the brine could be intermixed with other waste streams discarded from the refinery operations. In recent times, problems have arisen from the shortage of fresh water and disposal of the brine (equal to 10% of the crude oil desalted) without polluting public water streams or the recirculating water employed within the refinery for cooling and other purposes. The disposal of the brine from desalting processing has required careful management and disposal procedures. As a result, the amount of brine must be reduced.

The crude oil subjected to a desalting process may yet contain an undesirable amount of contaminating salt which prevents its ready utilization directly in a subsequent refinery process. For example, a desalted crude oil may contain about 2 pounds of salt per thousand barrels of crude oil. This amount of contaminating salt may prevent the desalted crude oil from being directly charged into a catalytic desulfurization unit. Otherwise, the salt causes various processing problems by corrosion attack and formation of catalyst plugging deposits. Thus, the salt content of desalted crude oil must be reduced to lower levels.

Not all of the contaminating salt is sodium chloride in crude oil. Included in the terminology "salt" in the petroleum industry are those salts in which the chloride ion is associated with metals such as potassium, lithium, magnesium and calcium. The metal carbonate, sulfide and silicate salts may also be present which can cause the same types of catalyst plugging problems as sodium chloride contamination in the hydrocarbon stream.

It has been proposed to remove these contaminating salts from crude oil or its products by treatment within an electrofilter. It is well known that suspended solids can be removed from a non-conducting organic liquid such as a hydrocarbon, by their passage through a filter mass subjected to a high intensity electric field in an electrofilter. In the electrofilter, the filter mass provides a porous matrix structurally contained by one or more energized electrodes. The resultant electric field must be of a sufficiently high intensity that the solids are tenaciously attached to the solid surfaces of the filter mass. Eventually, sufficient amounts of solids accumulate to make unsatisfactory the operation of the electrofilter. The solids may contain water which makes them highly conductive to electric current.

The most popular type of electrofilter employs a porous filter mass securely positioned within a vessel. This electrofilter is arranged so that the solids are held within the pore spaces of the filter mass under the action of an electric field. The filter mass may be of any fibrous material such as glass or rock wool, synthetic plastic fibers, and like filamentary material. Alternatively, the filter mass may be a porous material, such as polyurethane foam. Other non-particulate, open-foam materials have been employed as the filter mass. Electrofilters of this construction are very difficult to clean of accumulated solids. Generally, inplace solvent washings of the filter mass in these electrofilters does not return them to acceptable performance.

Electrofilters can utilize a particulate material arranged into a porous bed traversed by the organic liquid under the influence of an electric field. The particulate bed electrofilter usually employs a bed within a relatively fixed position. As a result, the particulate material is held against movement during the operations of solid removal and during regeneration or cleaning. In many cases, the electrofilter cannot be cleaned of accumulated solids due to this fixed-bed construction. The solids adhering to the filter masses of an electrofilter are held so tenaciously that they not only fill the available pore spaces, but are held to adjacent solid surfaces by great forces. These adhering solids usually cannot be removed without disassembly of the fixed bed in the electrofilter. The filter mass must be cleaned separately once it is removed from the remaining electrofilter elements. For example, the porous synthetic foam is removed from an electrofilter, and then washed separately with solvents for removing the adhering solids. The particulate bed electrofilters are most easily cleaned of accumulated solids by first removing the particulate material and replacing same and subjecting it to hand or mechanically agitated solvent washing.

It had been proposed to backwash the particulate bed electrofilters with high velocity flows of a liquid solvent directed upwardly through the bed. As a result, the solvent causes a forced upward movement of the particulate bed, or a substantial portion thereof. The displaced particles are unstable and periodically fall downwardly into the mass of the bed. This "slugging" phenomena usually occurs at a high frequency, e.g., one cycle per second. Alternatively, the liquid solvent can be injected upwardly through the bed at a relatively high "jet" velocity. This cleaning action produces "sprouting" which is a central upward movement of a small portion of the particulate material in the bed. Then, the displaced materials slowly fall into the surrounding bed annulus about the jet flow. Attempts to clean the particulate bed electrofilter by "slugging" or "sprouting" flow of injected liquid solvent have not been successful. The adhesion of the solids to the particulate material is so tenacious that such types of liquid solvent washings cannot remove sufficient amounts of the solids and adhering water droplets and films to rejuvenate the effectiveness of the electrofilter. These cleaning techniques are so cumbersome that usually the electrofilter filter mass is discarded and replaced wih a new quantity of the filter mass.

In recent years, there has been developed a technique, which technique is described in U.S. Pat. 3,394,067, for restoring the porous filter mass of an electrofilter system into acceptable operation by the removal of substantial quantities of adhering solids. In this method, the solids-containing filter mass is cleaned in place by creating a hydraulic disturbance of sufficient intensity to loosen the deposits which are then flushed from the porous mass by the fluid creating the disturbance. For this purpose, a liquid is flowed through the solids-containing porous filter mass while it is in place within the electrofilter. A change of a process condition concerning the liquid flow causes the sudden introduction of a gas phase within the porous filter medium. As a result, high turbulence flow conditions (similar to a water-hammer effect) are produced to loosen the deposited solids from the pores of the filter mass material. Preferably, gas is dissolved into a carrier liquid and the resulting mixture is passed into the electrofilter. A pressure reduction causes the gas to separate into the gas phase and results in a sudden fluid-surging condition being created in the filter mass. This cleaning function does not rearrange the matrix or pore pattern of the filter mass. However, this cleaning procedure does not operate with viscous and heavy crude oil as well as in a relatively light petroleum distillate.

The electrofilters, irrespective of the filter mass or the method of cleaning, have a common operating limitation. The condensation of water on the solid surfaces of the filter mass or adhering solids causes an immediate short circuiting of the electric field within the porous bed. The electrofilter immediately ceases to remove solids from the organic liquid. This water-sensitive operating limitation in the electrofilter has caused the failure of all earlier proposed procedures for removing salts from hydrocarbon streams such as crude oils. The refinery hydrocarbon streams previously treated had a sufficient water content, (in dispersed water and water in solution) that their entry into the porous bed of an electrofilter produces immediately a short circuit condition. For example, dispersed water in a small amount of 200 parts per million in a crude oil will quickly short circuit the conventional electrofilter. Attempts to avoid this short circuiting condition have included the spacing of all energized electrodes out of contact with the porous bed of the electrofilter. However, this arrangement does not produce a satisfactory operation of the electrofilter. Other attempts to avoid this short circuiting problem have included coating each energized electrode with an insulating material such as glass or plastic. None of these attempts have produced an operative process for removing salt which contaminates hydrocarbon streams.

The present invention is directed toward providing a process for the waterless desalting of a stream of salt-containing hydrocarbon such as crude oil and its products by the use of an electrofilter. In addition, the process avoids the problems of water condensation creating a short circuiting of the electrofilter, the difficult cleaning of accumulating salt solids from the particles forming the porous bed in the electrofilter, and the generation of large volumes of brine and other fluids creating environment pollution and disposal problems.

SUMMARY OF THE INVENTION

In accordance with this invention, there is provided a process for the waterless desalting of a salt-contaminated hydrocarbon stream such as crude oil and its products. The salt-carrying stream is provided with a dispersed water content of less than 1% by volume. The temperature of the stream is adjusted until all of the water is in solution within the hydrocarbon phase and only salt solids are dispersed within the stream. The stream is passed, with all of the water being held in solution, through a porous bed. The bed is formed of hard granular spheroidal particles, which particles are substantially uniform in size and of a rigid and substantially incompressible dielectric material. An electric field is established within the bed having an intensity of at least 5 kilovolts per inch of DC potential whereby the salt solids are removed from the stream by their tenacious adhesion to the spheroidal particles. The stream, with a reduced salt solids content, is removed to a subsequent utilization. The spheroidal particles are periodically cleaned in the absence of the electric field of the accumulated salt solids with a non-aqueous wash liquid for restoring the efficiency of the bed to remove further quantities of salt solids from the stream under the influence of the electric field. In another aspect of the present invention, there are provided steps for cleaning the spheroidal particles in a unique manner which is highly efficient. Other aspects of the process provide for the recovery of the removed salt solids in a non-aqueous form which permits ready disposal without water pollution problems.

DESCRIPTION OF THE DRAWING

The drawing is a perspective view, partially in vertical section, of an electrofilter system which is arranged for carrying out the steps of the present waterless desalting process.

DESCRIPTION OF SPECIFIC EMBODIMENTS

Referring now to the drawing, there is shown an electrofilter system for carrying out the steps of the present process. The system is depicted graphically as it would appear in a commercial environment such as an oil refinery. The hydrocarbon stream usually will be crude oil, or its products, which stream has a high electrical resistivity and also that is categorized as a dielectric fluid. The hydrocarbon stream may be that portion of the crude oil remaining after the removal of distillates or the like. For example, the hydrocarbon stream may be a salt-contaminated topped crude oil, atmospheric tower bottoms, vacuum tower bottoms and the like residuum products found in the refining of crude oil. The present description is directed primarily towards the waterless desalting of virgin crude oil; but it is equally applicable to the other types of hydrocarbon streams. For acceptance into a pipeline, crude oil is processed in the field to have a water content not above about 3% by volume. The crude oil can have an appreciable salt content, e.g., 50 pounds per thousand barrels (as sodium chloride). However, salt-contaminates in the crude oil include metal sulfides, magnesium and calcium chlorides and other types of metal salts which originate from the subterranean environment of the crude oil. Most of these salts are in solution in dispersed water while other salts are dispersed as solids in the hydrocarbon phase. The crude oil is transported to the refinery and processed through the various procedures for making useful products.

More particularly, the crude oil is brought into the present system through an inlet conduit 10 and moved by a pump into a superdehydrator 12 in which the water content is reduced to less than 1% by volume. Preferably, the water content of the dehydrated crude oil is less than 1/10 percent by volume. The superdehydrator 12 is a conventional piece of equipment and carries electrodes energized to DC potentials of 25–50 kilovolts. The high potential, DC electric field produces a superdehydration of the crude oil to especially low water contents. The coalesced water phase is removed as an underflow brine. The brine may be disposed in any suitable fashion within the refinery processing streams. Generally, the brine is a very small volume representing less than 3% of the crude oil flow to the dehydrator 12. Generally, the brine is less than 1% by volume of such hydrocarbon stream. The superdehydrated crude oil from the dehydrator 12 is passed through a heater 13 wherein the temperature of the crude oil is raised sufficiently to place all of the water into solution. As a result, the salt contaminant is dispersed as solids within the hydrocarbon tream. However, the particle sizes of these salt solids are extremely small, e.g., 1–10 microns. As a result, mechanical filtration is incapable of removing these solids from hydrocarbon streams in commercial operations.

It has been found with hydrocarbon streams containing less than 1% by volume of dispersed water at ambient temperatures (e.g., 100° F.) that elevating the temperature of the stream to approximately 300° F. places all of the water in solution. The salt contaminating such hydrocarbon stream is carried principally in solution in the aqueous phase, but a substantial amount is dispersed as salt crystals within the continuous hydrocarbon phase. Placing the dispersed water into solution causes the contaminating salt to be dispersed only as salt solids throughout the hydrocarbon phase. Heating the hydrocarbon phase to temperatures substantially above 350° F. is usually undesirable since increased hydrolysis of the salt contaminants produce undesired amounts of the highly corrosive acid, hydrogen chloride. However, the rate of hydrolysis at 300° F. is relatively negligible for the short period of time required for processing the hydrocarbon stream by the present process. Stated in another manner, the heated hydrocarbon stream passes through the electrofilter system in the steps of the present process in only several minutes (e.g., 5 minutes) so that the hydrolysis of the contaminating salt to hydrogen chloride is minimal in amount.

The degree of temperature elevation of the hydrocarbon is primarily a function of its water content as the stream enters the heater 13. For example, a crude oil containing 1% of dispersed water must be heated to about 300° F. to place all of the water in solution within the continuous hydrocarbon phase. A crude oil having 0.5 percent of dispersed water need be heated only to 250° F. to place all the water into solution. A crude oil having approximately 0.25% by volume of dispersed water need be heated only to 175° F. to place all of the water into solution. The amount of temperature elevation required to place all of the dispersed water into solution in the hydrocarbon phase may be readily determined by laboratory procedures or by reference to standards charts and tables.

The hydrocarbon stream passes from the heater 13 through a motor control valve 15 to the inlet 14 of the electrofilter 16. The electrofilter 16 is composed of a metallic vessel 17 carrying top and bottom flanged closures 18 and 19, respectively, which closures may be secured in any fashion such as by bolting. The electrofilter 16 has an outlet conduit 21 in which flow is controlled by a motor control valve 22 for carrying the purified stream into a product outlet conduit 23. The electrofilter 16 contains a porous bed 24 which is comprised of a plurality of hard granular, spheroidal particles 26. These particles should be of a hard granular material which is substantially uniform in size. The term "spheroidal" is intended to include round, and oval and other non-rounded particles having minor to major axes in ratios not exceeding 4 to 6. By the term "uniform in size" is meant particles whose size distribution is not greater than two to one in average maximum dimensions. In addition, these spheroidal particles should be rigid and of a substantially incompressible dielectric material. By "dielectric material" is meant a material having a relatively high electrical resistivity and a small dielectric constant approaching that of the hydrocarbon stream to be treated. The dielectric material, for best results, should have a dielectric constant generally below 8, and preferably, a constant in the range of about 5 to 7. Stated in another manner, the particles should be of a dielectric material having a relatively high electrical resistivity in comparison to water. The dielectric properties of these spheroidal particles provide a surface for efficient retention of the extracted solids in response to an electric field established within the electrofilter 16. Moreover, the surface of these particles provide for the ready release of the accumulated solids upon agitation of these particles (without the electric field) with a suitable wash liquid.

Any suitable solid dielectric material may be employed which has a sufficient compressive strength to resist being crushed in the bed 24. For example, blast furnace slag from steel mills having a range of particle sizes between one-eighth and one-half inch (in maximum dimension) may be employed. Similarly, a screened river gravel having dimensions between one-quarter and one-half inch sizes (in maximum dimension) may be employed. It is preferred to employ a spheroidal particle bed 24 which has approximately between 30 and 40 percent voids. It has been found that such beds operate very efficiently in removal of solids from hydrocarbon streams in the present process.

Preferably the spheroidal particles 26 are selected from glass beads having about a one-quarter inch diameter. In particular, the one-quarter inch diameter glass beads which are employed for propping subterranean formations during oil well stimulation techniques have been found to be very useful in the present process. These beads are specially prepared for use in propping subterranean formations using hydrofracing techniques because of exceptional physical characteristics. These special physical characteristics are provided by rapid chilling of molten glass during the manufacture of these beads. This rapid chilling procedure forms a very tough, hard and smooth skin about the glass particles. These particles have a compressive strength greatly in excess of 50,000 p.s.i. and a tensile strength above approximately 8,000 p.s.i. They are a commercial article readily obtained from the Halliburton Company of Duncan, Okla. Since the "skin" about these beads is very smooth, the adhering solids (without the electric field) can be completely removed by a proper use of wash liquid. The skin is also very hard to resist scratching and the resultant reduction in the very high electrical resistance of each particle.

The bed 24 of spheroidal particles 26 occupies a substantial portion of the internal volume of the vessel 17. The bed 24 is usually of a capacity to provide a residence time of one to two minutes to the hydrocarbon stream being treated. Preferably, the bed has a cross-sectional area giving a flow volume to cross-sectional area of 7 to 10 gallons per minute per square foot of the bed 24. A void region 27 resides between the flanged closure 18 and the top surface of the bed 24. The void region 27 should have a volumetric capacity sufficient to permit a substantial vertical expansion of the particles 26. Generally, the particles should be permited to expand at least 5% by volume to permit suitable cleaning action to be produced in accordance with the novel process hereinafter described. Usually, the bed 24 need not be expanded above approximately 40% by volume into the void region 27.

An electric field is provided within the bed 24 of the electrofilter 16. The electric field should have an intensity sufficient for removing solids from the hydrocarbon stream. More particularly, the electric field causes the solids to be removed from the hydrocarbon stream as it traverses the bed 24 before reaching the outlet conduit 21. The electric field causes these solids to adhere very tenaciously to the exterior surfaces of the particles 26. The electric field can be created by any suitable equipment of which there are many examples in the prior art. As illustrated in the drawing, the electric field can be provided by energized rod electrode 28 which is supported upon an entrance bushing 29 threaded into the flanged closure 18. Preferably, the electrode 28 is coaxially disposed within, but electrically isolated from, the vessel 17. The electrode 28 may extend substantially throughout the bed 24. Preferably, the electrode 28 extends only approximately between one-third and one-half of the depth of the bed 24. By this arrangement, the electric current loading upon electrical components associated with the electrode 28 is reduced by yet provides high intensity electric field for acceptable solids removal from the hydrocarbon stream over an extended period of time.

The electrode 28 is energized from any suitable source of power such as a DC power pack 30. The power pack 30 is arranged to provide suitable energizing potential to the electrode through a high voltage cable 31. The cable 31 passes the high voltage current from the power pack 30 through the entrance bushing 29 to the electrode 28. Generally, the pack 30 provides energizing potentials between the electrode 28 and the vessel 17 of magnitudes sufficient to create between 5 and 50 kilovolts per inch gradient across the particles 26 in the bed 24. The pack 30 must provide energizing potentials of suitable elevated magnitudes to provide the desired potential gradients within the bed 24. These gradients create the force for removing the solids from the hydrocarbon stream traversing the electrofilter 16 and for the tenacious adhesion of the removed solids about the surfaces of the particles 26. The operation of the pack 30 can be controlled by a switch 32 whose operation is remotely controlled as illustrated by a chain line. The switch 32 interrupts the primary source of current from an input cable 33 to the pack 30.

The electrofilter 16 operates for extended periods of time removing substantially large amounts of the solids from the hydrocarbon stream. Eventually, the efficiency of the electrofilter 16 begins to decrease due to the accumulation of solids upon the particles 26. The efficiency of the bed 24 may be decreased by the accumulating solid so that one of two events occurs. First, the accumulated solids may reduce the effectiveness of the electrofilter 16 in removing solids from the liquid hydrocarbon stream to an extent that the remaining solids content makes unacceptable a desired subsequent utilization of the purified stream in the product conduit 23. Second, the accumulated solids may short circuit the electric field through the particles 26 between the electrode 28 and the vessel 17. The latter condition occurs rather suddenly whereas the former is a gradual reduction in operating efficiency.

At this time, the electrofilter 16 has reached a state requiring cleaning for the removal of the accumulated solids from the particles 26 if the present process is to continue an acceptable level of solids removal from the hydrocarbon stream.

The accumulated solids could be removed from the particles 26 of the bed 24 by any manner of cleaning. For example, flow can be terminated to the electrofilter 16 by the closure of valves 15 and 22. At this time, the hydrocarbon stream is passed through a bypass conduit 34 by opening motor control valves 36 and 37. The liquid hydrocarbon stream diverted to the bypass conduit 34 may be sent through the product conduit 23 to a second electrofilter for treatment. Depending upon the length of the cleaning operation or cycle, the hydrocarbon stream could be bypassed to the subsequent utilization directly without purification in a second electrofilter when the amount of solids contained in the bypassed stream is a relatively small amount compared to the overall flow of the treated stream.

The particles 26 could be removed from the electrofilter 16 by using a vacuum hose or the like for their transfer to an exterior cleaning vessel where they can be intimately washed with a wash liquid. However, it is preferred that these particles be cleaned inplace. In accordance with another aspect of this process, the energization of the power pack 30 is interrupted through opening of the switch 32. A flow of wash liquid is directed upwardly through the particles 26 so as to expand the bed 24 into the void region 27. For this purpose, the wash liquid is taken from a tank 38 and moved by a pump 39 through a conduit 41 into a distributor 42 residing in the lower portion of the vessel 17. Preferably, the wash liquid is a hydrocarbon solvent such as kerosene, naphtha, diesel fuel and other distillates. For best results, the wash liquid is contained in a closed cycle system in the present process. The flow through the conduit 41 is regulated by a motor control valve 43. The distributor 42 may take any configuration but preferably is a vertical pipe which etxends a short distance into the lower portion of the bed 24. The distributor 42 has a plurality of openings 44 in its side wall for introducing the wash liquid into the vessel 17. The wash liquid is introduced at a sufficient rate to cause the bed to expand into the void region 27 by at least 5% by volume. Preferably, the wash liquid causes a volumetric expansion of the bed 24 in the range of between 30 and 35%. Generally, the bed 24 does not need to be expanded more than 40% by volume into the void region 27 for acceptable results in the cleaning operation. For example, an upward flow of kerosene in the amount of approximately 7 cubic feet per minute for each 100 pounds of spheroidal particles 26 within the electrofilter 16 is sufficient to expand the bed 24 by about 30% by volume. The flow of the wash liquid under these bed expanded conditions will not produce the desired cleaning of the tenaciously adhering solids from the particles 26. The wash removes only the weakly attached solids from these particles. In accordance with the present process, a small quantity of gas, such as nitrogen, natural gas, or other gas acceptable within environment of the bed 24 without creating injurious conditions, is introduced into the wash liquid entering the bed 24. For this purpose, a suitable source introduces a flow of gas into a gas inlet conduit 45 under the controlled operations provided by a motor control valve 47. The gas intermingles with the solvent entering the distributor 42 of the vessel 17. The amount of gas introduced into the wash liquid is not large. Generally, the gas will be introduced in that amount which produces an additional 4 to 5% volume expansion of the bed 24 into the void region 27. It has been found that usually one to two s.c.f.m. of gas for each 7 cubic feet per minute of wash liquid flow are required for good cleaning of the solids from the particles 26. This flow with one-quarter inch glass beads corresponds to a superficial velocity of 280 inches per minute.

The addition of this small amount of gas into the wash liquid produces a phenomenal change in the cleaning environment of the particles 26. This small amount of gas produces a unique circulating bed condition within the electrofilter 16. By "circulating bed condition" is meant that all the particles 26 are slowly moved in a general circular or spheroidal movement within the vessel 17 between closures 18 and 19, and each invidual particle has a circular or toroidal movement relative its neighbor at moderate velocities but with very intimate contact. The particles 26 constantly contact one another and the walls of the vessel 17. In addition, the gas phase within the wash liquid provides a second unique function which resembles the production of a froth in air flotation operations. Small bubbles of gas produce a thorough washing action which quickly removes the adhering solids from the surfaces of these particles. The removed solids are gathered with small gas bubbles into a froth in their passage upwardly through the bed 24 and the void region 27, and then outwardly in a wash liquid outlet 46 through a motor control valve 47 and into a solid separator 48. Although the particular operation of the gas introduction into the wash liquid for producing the outstanding cleaning of the solids from the particles 26 is not altogether understood, it is believed however that the injected gas produces multitudes of tiny gas bubbles upon the particles 26 which appear to create constantly changing particle-gas-liquid interfaces that provide the major scrubbing action to remove the adhering solids from these particles. Even small amounts of water, if inadvertantly introduced into the electrofilter 16, can be combined with, be absorbed or otherwise be carried upon these solids or these particles which makes these surfaces highly conductive to electrical currents. This novel scrubbing action will remove any water films, droplets, and solids adhering to the particles 26. As a result, this novel cleaning function is capable of removing concurrently both sides and water from the particles 26.

The solids separator 48 can be a settling vessel containing baffles or the like where the removed solids are segregated by gravitational force from the wash liquid. These settled solids are removed periodically through a waste solids outlet 49 by operation of a motor control valve 51. The removed solids may be dried to form a waste solid which could be buried in a landfill. The wash liquid, freed from the solids in the separator 48, is transferred by a conduit 52 to the wash liquid storage tank 38. The gas phase quickly separates from the wash liquid in the separator 48 and escapes through the gas vent 53 to any suitable disposal or recovery system. The solids usually separate relatively quickly in the separator 48 from a light petroleum distillate such as kerosene, forming the wash liquid.

Generally, only a few minutes of time are required for the expanded bed-type of cleaning action of the present process to restore the spheroidal particles 26 to the proper operating state in the vessel 17. Thus, the electrofilter 16 can be operated in the present process for an extended period of time, as for example 36–50 hours in duration. Then, the electrofilter 16 is placed into the cleaning cycle which may be, for example, less than 30 minutes in duration. At the end of the cleaning cycle, the pump 39 is shut down and the valves 43, 47 and 50 are closed.

In the periodic cleaning of the particles 26 within the electrofilter 16, the wash liquid removed through the conduit 45 may be passed to the solid separator 48 as previously mentioned or diverted to an electrofilter 54 by using (motor controlled) block valves 55, 57, 58 and 60. The electrofilter 54 may be of any design, but is particularly effective where it is packed with a porous foam such as urethane foam. The electro-filter 54 is operated until the accumulating salt solids fill the pores of the foam sufficiently to degrade operation to unacceptable levels. At such time, the electrofilter is disassembled and the foam pack replaced or cleaned. Thus, salt solids are removed as dry solids from the electrofilter system directly either as an underflow taken through the outlet 49 of solid separator 48 or by their entrapment in the porous pack of an electrofilter 54.

Any moisture extracted by the wash liquid from the electrofilter 16 is removed when short circuiting conditions are being approached within the porous bed 24. Any dehydration means may be employed for this purpose. For example, the was liquid in the tank 38 can be passed through a drier 64 by using (motor controlled) block valves 61, 62 and 63. The drier 64 contains a dehydrating material, such as calcium chloride, to remove the small amounts of water contained in the wash liquid. The dehydrated wash liquid then passes through a heater 59 to raise its temperature sufficiently to heat the particles 26 to temperatures at or slightly above those of the hydrocarbon stream at the inlet 14. As a result, no moisture can condense upon the particles by the inflow of the crude oil through the inlet conduit 14.

At the conclusion of the cleaning cycle, valves 15 and 22 are opened, switch 32 closed and the electofilter 16 is again placed into operation. The valves 36 and 37 are closed in the bypass conduit 34. The electrofilter 16 again functions to remove solids from the incoming hydrocarbon stream. The resalted stream is sent to the product conduit 23.

The unique cleaning cycle employed in the present invention removes solids from the particles 26 of the electrofilter 16 to the same extent they could be hand or mechanically cleaned in an external solvent washinng to restore their original efficiency.

The unique cleaning cycle of the present invention may be readily distinguished from cleaning with only a flow of a liquid which passes upwardly through the bed 24 at certain rates sufficient to expand it into the void region 27. These certain rates of liquid flow produce a movement of a substantial portion of the particles 26 of the bed upwardly into the void region 27 with a relatively high rate of movement. The particles are held as a coherent mass in the upper portions of the vessel 17 for a short period of time and then they fall suddenly to the lower portion of the vessel 17 after the mass becomes hydrodynamically unstable in the flow of liquid. This upward movement and sudden fall is termed "slugging" and can occur to a relatively high frequency. For example, slugging has been observed to occur at a one cycle per second of frequency during an operation of an electrofilter with only high velocity liquid flow used to clean the particles 26. Alternatively, a high velocity jet of liquid injected coaxially through the vessel 17 produces a continuous movement centrally upwardly of the particles 26 from the bed 24. The particles move upwardly into the void region 27 and then fall downwardly around the exterior annulus of the bed 24 in a relatively slower movement. This resembles the "jetting" action of a large central jet within a fountain.

The displacement of the particles 26 with a flow of liquid under slugging or jetting flow conditions does not provide adequate solids removal from the particles 26. Both of these flow conditions even after extended cleaning periods do not produce the excellence of cleaning that the steps of the present cleaning steps produce within the bed 24.

Although the various operative functions described relative to the electrofilter shown in the drawing may be accomplished by manual control, it is preferable to obtain such operation through the use of automated devices. More particularly, the various motor control valves, pumps and the like may be actuated by a controller providing actuating signals as indicated by the chain line associated with these control elements. More particularly, a controller 56 can be employed to receive either manual or time based operate and clean cycle commands. The controller applies the necessary control signals in preset chronology to the various pumps, heaters, and motor control valves as indicated through the chain lines. In the operate command, the controller 56 actuates the pump 11, opens valves 15 and 22, closes valves 36 and 37, and actuates switch 32 of the pack 30. The remaining process equipment is held in a non-flowing condition. During the cleaning cycle, the valves 15 and 22 are closed, switch 32 is open and the flow of the incoming hydrocarbon stream is diverted through the bypass conduit by opening of the valves 36 and 37. At this time, the wash liquid system is actuated by opening the valves 43, 47 and 50 and starting the pump 39 to provide a flow of wash liquid and gas upwardly through the electrofilter 16. The valves 55, 57, 58 and 60 are adjusted to divert flow through the electrofilter 54 for solids removal or the solids can be allowed to separate within the separator 48. The controller 56 provides an operative command to the valve 51 to dump separated solids from the separator 48 to some convenient disposal arrangement. The dry wash liquid system is actuated by operating the heater 59, closing the valve 61 and opening valves 62 and 63. The dry and heated wash liquid passes from the drier 64 into the inlet conduit 41. The dry wash liquid flow continues until the bed 24 is substantially free of moisture and at operating temperature. At this time, the controller 56 opens the valves 15 and 22, closes the switch 32, closes valves 43 and 50 so that the hydrocarbon stream then passes through the electric field in the bed 24 and into the product conduit 23.

Obviously, other arrangements for controlling the functioning of the various valves, pumps, heat exchangers, etc., of the present process may be employed. The controller 56 may be of any suitable design, but preferably is a pneumatic signal controller such as may be obtained in a marketplace under the name "Autocater Alarm System." This system provides (on a preset time interval or in response to an operate control command) a plurality of signals in preset sequence for operating the motor control valves, switches, pumps, etc., of the arrangement illustrated in the drawing for carrying out the functions of the present process. Of course, these valves, switches, etc., may be operated manually. However, an automatic control sequencing system is of great advantage in providing proper control sequencing and trouble-free operations with a minimum of operator time.

The waterless desalting process of the present invention provides many advantages and avoids the problems in prior art systems. The heating of the incoming hydrocarbon stream to an electrofilter to temperatures where all the water is in solution provides an exceptional environment for removing the dispersed salt-contaminants from the hydrocarbon phase. The electrofilter 16 is well able to very effectively remove such solids at relatively low cost from a hydrocarbon stream. In addition, the novel cleaning steps of the present invention for removing the salt solids from the particles 26 produces their removal and separation from the wash liquid as dry solids which may be readily sent to disposal without the usual large volumes of brine present in conventional desalting techniques. Also, the wash liquid system is in a close cycle operation where it also functions to not only clean the salt solids from the particles 26, but also to place the electrofilter into a condition where none of the water in solution in the incoming hydrocarbon stream can condense upon the particles 26 and short circuit the bed 24 during operation of electrofilter.

The waterless desalting process of the present invention was evaluated in a pilot plant which proved its great utility. The pilot plant consisted of electrical heaters for raising the temperature of a crude oil stream prior to its passage through an electrofilter with the desalted crude oil passing through a cooler and into a receiver. The electrofilter was a vertical vessel 2½ inches in internal diameter and 24 inches in height with a centrally positioned electrode extending from its top portion into a porous bed formed of one-quarter inch glass hydrofracing beads. The electrode was one inch in diameter and 20 inches in length. The electrode was energized with a power pack which provided an energizing potential of 8.6 kilovolts DC to the rod electrode. The crude oil was passed into the heaters at a rate of 800 milliliters per minute. The crude oil remained within the electrofilter for approximately 2–3 minutes. The crude oil had a salt content of 14 pounds per thousand barrels, an API gravity of 34.4 a BS & W of less than 0.1% by volume, and was charged at a rate of 300 milliliters per minute. The heater elevated the temperature of the crude oil to 310° F. and a pressure of 96 p.s.i.g. was maintained upon the crude oil to prevent its vaporization. The power supply provided a current of 22 milliamperes through the operating period. The desalted crude oil had only 29% of the salt contaminates remaining after a single passage through the electrofilter. In addition, the electrofilter removed substantial amounts of the oil insoluble, non-filterable solids which were present in it. The solids were principally iron oxides and sulfide dispersed within the crude oil.

From the foregoing, it would be apparent that there has been provided a process for the removal of salts from hydrocarbon streams which can be operated continuously with extended operate cycles and intervening short cleaning cycles. It will be understood that separate steps and alterations of steps in the present process may be employed without departing from the spirit of this invention. This is contemplated by and within the scope of the appended claims. Additionally, it is intended that the present description is to be taken as an illustration of the present process.

What is claimed is:

1. A process for the waterless desalting of a salt-contaminated stream of hydrocarbon such as crude oil and its products comprising:
    (a) providing the salt-carrying stream with a dispersed water content of less than 1% by volume;
    (b) adjusting the temperature of said stream until all of said water is in solution within the hydrocarbon phase, and only salt solids are dispersed within said stream at temperature not above 350° F.;
    (c) passing said stream with all of the water being held in solution through a porous bed, said bed being formed of hard granular spheroidal particles, which particles are substantially uniform in size and of a rigid and substantially incompressible dielectric material;
    (d) establishing an electric field within said porous bed having an intensity of at least 5 kilovolts per inch of DC potential whereby said salt solids are removed from said stream by their tenacious adhesion to said spheroidal particles;
    (e) removing said stream with a reduced salt solids content to a subsequent utilization; and
    (f) periodically cleaning said spheroidal particles, in the absence of the electric field, of the accumulated salt solids with a non-aqueous wash liquid for restoring the efficiency of said bed to remove further quantities of salt solids from said stream under the influence of the electric field.

2. The process of claim 1 wherein said periodic cleaning of said spheroidal particles includes
    (a) terminating the flow of said stream through said porous bed;
    (b) discontinuing said electric field within said porous bed;
    (c) passing a non-aqueous wash liquid upwardly through said porous bed at a flow rate sufficient to expand same in an amount of at least 5 percent by volume, and
    (d) introducing into said wash liquid of a small amount of gas sufficient to expand said porous bed by an additional 5 percent by volume;

whereby said spheroid particles follow a circular course in movement within said porous bed in its expanded state and the individual spheroidal particles are induced into continuous circular movements relative to one another with extreme intimate contacting for efficient loosening of the adhering salt solids which are removed in upward fluid flow from said porous bed in a froth-like condition.

3. The process of claim 2 wherein said wash liquid is a petroleum distillate.

4. The process of claim 3 wherein said gas is nitrogen.

5. The process of claim 2 wherein said wash liquid is passed upwardly through said porous bed at a superficial velocity of about 280 inches per minute through said spheroidal particles.

6. The process of claim 1 wherein said hydrocarbon stream from step (a) is a crude oil having a dispersed water content less than 1% by volume at a temperature not above 100° F., and all of the dispersed water is placed into solution in the hydrocarbon phase by heating the crude oil to a temperature of about 300° F. whereby the salt contaminates are salt solids dispersed within said stream.

7. The process of claim 1 wherein said spheroidal particles are round glass beads with a diameter of about one-quarter inch.

8. The process of claim 2 wherein said salt solids removed from said spheroid particles are separated from said wash liquid and gas, and the clarified wash liquid is recycled into subsequent periodic cleaning of said porous bed.

9. The process of claim 8 wherein said salt solids are separated from said wash liquid and gas by decantation.

10. The process of claim 9 wherein said salt solids subsequent to separation of said gas are separated from said wash liquid by passage through an electrofilter.

11. The process of claim 2 wherein said wash liquid is adjusted in temperature to substantially the temperature of said hydrocarbon stream so that no quantities of dissolved water therein can condense upon said particles of said porous bed under the influence of said electric field.

12. The process of claim 2 wherein said wash liquid flows within a closed circuit and at least some of said wash liquid is dehydrated before passage through said porous bed.

13. The process of claim 12 wherein during completion of said periodic cleaning of said spheroidal particles, the wash liquid is heated to a temperature at least as high as the temperature of the hydrocarbon stream which is to enter said porous bed.

14. The process of claim 2 wherein said wash liquid is maintained in a condition during passage through said porous bed whereby any water is maintained in solution in said wash liquid, and upon completion of said periodic cleaning the porous bed is maintained at a temperature whereby no significant amounts of dissolved water in said hydrocarbon stream can condense upon said spheroidal particles in the presence of said electric field.

References Cited
UNITED STATES PATENTS

| | | | |
|---|---|---|---|
| 2,573,967 | 11/1951 | Hamlin | 204—184 |
| 3,394,067 | 7/1968 | Shirley | 204—180 R |
| 3,190,827 | 6/1965 | Kok et al. | 204—302 |
| 2,534,907 | 12/1950 | Ham et al. | 204—188 |
| 2,136,660 | 11/1938 | Martin | 210—80 |
| 1,406,340 | 2/1922 | Brown | 210—80 |
| 2,996,442 | 8/1961 | Eberly, Jr., et al. | 204—184 |

JOHN H. MACK, Primary Examiner

T. TUFARIELLO, Assistant Examiner

U.S. Cl. X.R.

204—308

UNITED STATES PATENT OFFICE
CERTIFICATE OF CORRECTION

Patent No. 3,799,856                    Dated  March 26, 1974

Inventor(s)   A. D. Franse

It is certified that error appears in the above-identified patent and that said Letters Patent are hereby corrected as shown below:

Column 5, line 36 for "tream", read +++stream+++;

Column 9, line 38, for "sides", read +++solids+++;

Column 10, line 28, for "resalted", read +++desalted+++;

line 33, for "washinng", read +++washing+++;

Column 12, line 11, after "34.4" insert a comma (,); and

Column 12, line 43, for "temperature", read +++temperatures+++.

Signed and sealed this 17th day of September 1974.

(SEAL)
Attest:

McCOY M. GIBSON JR.                C. MARSHALL DANN
Attesting Officer                  Commissioner of Patents